May 17, 1960
W. L. MORRISON
2,936,548
METHOD OF PRODUCTION, FIXATION AND USE OF NITROGENOUS
COMPOUNDS FROM ENGINE EXHAUST, FOR IRRIGATION
Filed Sept. 25, 1956
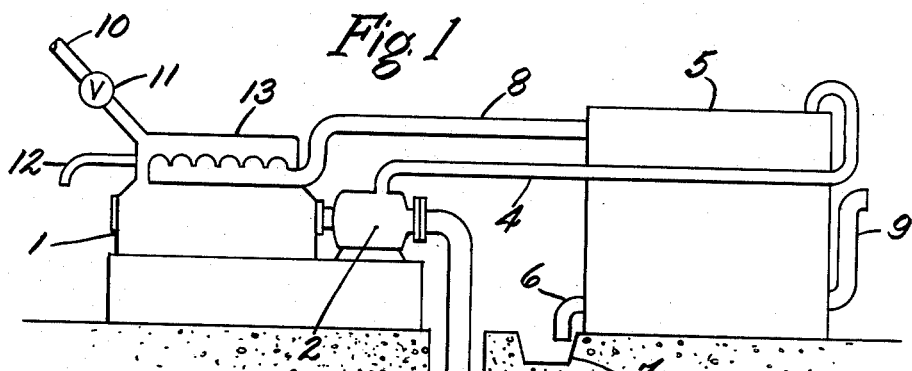
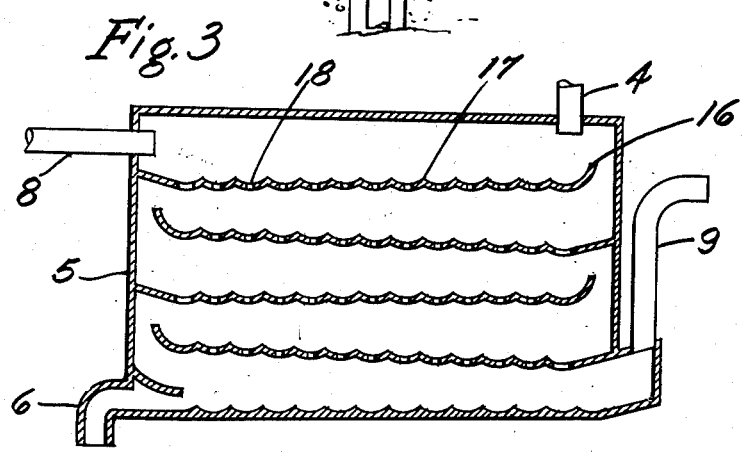
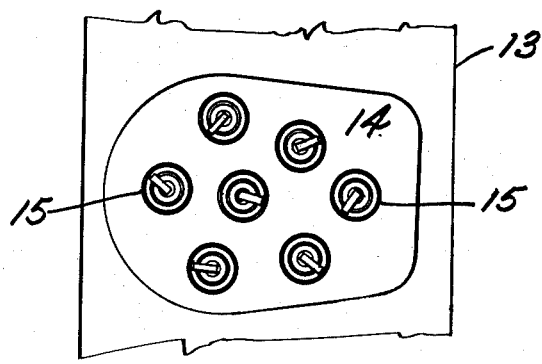
INVENTOR.
WILLARD L. MORRISON
BY PARKER & CARTER
ATTORNEYS

United States Patent Office 2,936,548
Patented May 17, 1960

2,936,548
METHOD OF PRODUCTION, FIXATION AND USE OF NITROGENOUS COMPOUNDS FROM ENGINE EXHAUST, FOR IRRIGATION

Willard L. Morrison, Lake Forest, Ill., assignor to The Union Stock Yard and Transit Company of Chicago, Chicago, Ill., a corporation of Illinois Application September 25, 1956, Serial No. 611,865

6 Claims. (Cl. 47—58)

My invention relates to production, fixation and use of nitrogenous compounds, especially for agricultural purposes and is a continuation in part of my co-pending application Serial No. 563,415, filed February 6, 1956, now abandoned.

Under some circumstances, the exhaust gas of an internal combustion engine contains certain nitrogenous compounds, among them NO which is not water soluble and under some circumstances $NO_2$ and other water soluble nitrogenous compounds. Under ordinary circumstances internal combustion engines are preferably so operated that such nitrogenous compounds frequently corrosive are at a minimum, when the engine is operated with an excessively lean mixture, it may have an exhaust with 1.1 percent or more NO by volume.

An internal combustion engine may use a mixture in the order of 16.5 to 1 of fuel and air. If the mixture is lean in the order of eighteen or nineteen parts of air to one of gas fuel with a compression of say 9.3 to 1, the exhaust will have 1.1 percent NO or more. Such a mixture, however, is too lean for ordinary engine operation and I have found that if instead of using a single ignition point, a multiplicity of separate points of ignition distributed about the combustion chamber are used, the temperatures high enough to result in the formation of NO from the combination of the nitrogen in the air with the oxygen not burned with the fuel result, and under these circumstances, a mixture much leaner than that heretofore practicably possible may be burned satisfactorily.

While such a very lean mixture will not fire successfully with a single ignition point and so in order to get power a richer mixture must be used, a multiplicity of ignition points make satisfactory engine operation possible.

Under these circumstances with a multiplicity of spark plugs, the cooling by expansion will bring the exhaust temperature down to something in the order of 1100° F. during the time between ignition and exhaust and this sudden drop in temperature is sufficient to result in stabilizing the NO to the point that it may unite with more of the oxygen in the charge to form $NO_2$.

If this exhaust gas containing among other things NO and $NO_2$ is then exposed to a very large quantity of water, the $NO_2$ will dissolve in the water and the NO may actually some of it remain in suspension or mix with the water being subsequently oxidized.

It would not usually be economical to provide the very large amount of water necessary for this reaction under ordinary circumstances. However, in connection with irrigation very large quantities of water are pumped by internal combustion engines for discharge on the land and since the large quantity of water is available anyway, then if the engine is operated so as to produce even 1.1 percent NO and if the nitrogenous compounds can be picked up by the water and the water therefore can act as a conveyor for the nitrogenous compounds and carry them directly to the land where the nitrogenous compounds can be supplied to vegetation, we have a situation where the nitrogenous compounds in the exhaust gas which would otherwise be wasted or disregarded can be used to provide necessary nitrogenous fertilization of the soil.

It is sufficient to have the exhaust gas from such a lean mixture pass through a spray chamber through which some or all of the water being pumped for irrigation passes so that the water and the exhaust gas are in such intimate contact that enough of the nitrogenous compounds reaches the water and is conveyed by the water to the land to substantially promote vegetable growth.

The internal combustion engine requires no change except for the provision of a multiplicity of separate sparks which will fire simultaneously so that the very lean mixture may be fired near upper dead center from a multitude of points about the periphery of the chamber. That being the case, flame propagates from the individual spark plugs or spark points with sufficient rapidity to permit complete combustion at or about upper dead center, and combustion will be so rapid that exceptionally high temperatures are immediately developed in the combustion space, temperatures above that needed (4000° F.) to cause oxygen and nitrogen in the air to unite to form NO. If a rich mixture is used, so much of the oxygen will be burned up as it combines with the hydrocarbon, preferably natural gas or the like, that there will be no oxygen left to unite with the nitrogen but with a very lean mixture there will always be a substantial amount of unused oxygen, some of which will unite under the temperature conditions above referred to, with the nitrogen in the air to produce NO and then as work is done, expansion takes place, the temperature drops to the point at which the NO may unite with more of the oxygen being oxidized to $NO_2$ or the like. Immediately thereafter the exhaust gas containing NO and $NO_2$ if then exposed to the water in the very large quantities available will be picked up by the water and conveyed to the land.

One method to insure simultaneous sparking of all of the spark points would be to have a single breaker in a low tension line and the low tension line exciting a separate spark coil for each spark plug. Under these circumstances, when the low tension circuit is broken, the high tension current will be generated in a closed circuit including a coil and a plug, there being a separate circuit for each plug.

The exhaust gas may be bubbled through a water bath but preferably it passes through a spray chamber through which water discharged by the pump driven by the engine also passes. A more intimate contact of water and exhaust gas will take place and a larger proportion of the nitrogenous compound present in the exhaust gas will be picked up by the irrigation water and carried to the land.

While I have referred to hydrocarbon fuel, it will be understood that the preferred fuel would be such a hydrocarbon fuel as natural gas.

Under some circumstances, I have found that more satisfactory results can be obtained by the use of a catalyst such as platinum; spark plugs with platinum points have been used with success.

My invention is illustrated more or less diagrammatically in the accompanying drawing, wherein—

Figure 1 shows a flow sheet illustrating my invention;
Figure 2 is a bottom plan view of an engine cylinder head modified to use my invention;
Figure 3 is a section through the extraction chamber.

Like parts are indicated by like characters throughout the specification and drawings.

The internal combustion engine 1 drives pump 2 which draws water from well 3 or other suitable water supply source and discharges the water through pipe 4 to extraction chamber 5, from which it is discharged through pipe 6 to irrigation channel 7. The engine exhaust passes through pipe 8 to chamber 5 and then is discharged to atmosphere through exhaust pipe 9.

Cooling liquid reaches the engine through pipe 10 controlled by valve 11 and is discharged through pipe 12. The engine cylinder head 13 has a combustion chamber 14 for each cylinder, there being a multiplicity of spark plugs 15, for example, seven, spaced about the chamber. Other engine details being conventional are not illustrated.

The extraction chamber has for its function to insure the relatively long intimate contact between the water and the exhaust gases which will result in the extraction of the nitrogenous compounds from the gas. The water discharged by the pump 2 enters the chamber 5 at the top, flows laterally across the inclined tables 16 which are corrugated at 17 and perforated at 18 so as to provide a tortuous path for the water sheet as it flows downwardly to discharge at 6. The engine exhaust travels a generally tortuous path which may be generally in counter current or the reverse as the case may be, to the water between the tables 16 in contact with the thin sheets of water traveling therealong and with the sprays discharged from table to table by the perforations 18 therein. Corrugations 17 tend to agitate and break up the water sheets to promote further contact between gas and water.

The coolant for the engine may come from any suitable source. A pump circulating water through a radiator or the water pumped from the well or any other desired means, the specific details of which form no part of the present invention are not illustrated, the important thing being that the valve 11 makes it possible to control the rate at which the coolant circulates so as to control the temperature in the engine to insure that the temperature will at the high point exceed 4000° F.

I claim:

1. The method of producing, recovering and using nitrogenous compounds which consists in burning a mixture of air and gaseous hydrocarbon fuel in the proportion of approximately nineteen parts of air to one part of fuel by simultaneously igniting the mixture at a multiplicity of spaced ignition points, until the mixture has burned at a temperature above 4000 degrees F., expanding the mixture with sudden drop in temperature of more than 900 degrees F., using the expansive power of the mixture to pump water, discharging the products of combustion and maintaining them in intimate contact with the water being pumped until substantially all of the nitrogenous compounds in the exhaust gas have been absorbed by the water and then discharging the pumped water for irrigation and discharging the remaining exhaust gas to atmosphere.

2. The method of producing, recovering and using nitrogenous compounds which consists in burning a lean mixture of air and gaseous hydrocarbon fuel in the proportion of not less than nineteen parts of air to one part of fuel by simultaneously igniting the mixture at a multiplicity of spaced ignition points, until the mixture has burned at a temperature above 4000 degrees F., expanding the mixture with sudden drop in temperature of more than 900 degrees F., using the expansive power of the mixture to pump water, discharging the products of combustion and maintaining them in intimate contact with the pumped water until substantially all of the nitrogenous compounds in the exhaust gas have been absorbed by the water and then discharging the pumped water for irrigation and discharging the remaining exhaust gas to atmosphere.

3. The method of producing nitrogenous compounds which consists in supplying to the combustion chamber of an internal combustion engine, a mixture of air and gaseous hydrocarbon fuel in the proportion of not less than eighteen parts of air to one part of fuel, simultaneously igniting the mixture at a multiplicity of spaced ignition points, so spaced and in such number that effective combustion takes place and temperatures in the order of 4000 degrees F. are generated in the combustion chamber, allowing the resultant products of combustion to expand and do work as the temperature of the burnt gases drops more than 900 degrees F., discharging the products of combustion, passing the products of combustion into contact with water for the absorption of the nitrogenous compounds from the exhaust gas and then discharging the water for irrigation purposes and discharging the remaining exhaust gas into the atmosphere.

4. The method of producing nitrogenous compounds which consists in supplying to the combustion chamber of an internal combustion engine a mixture of air and gaseous hydrocarbon fuel in the proportion of not less than eighteen parts of air to one part of fuel, simultaneously igniting the mixture at a multiplicity of spaced ignition points, so spaced and in such number that effective combustion takes place, cooling the walls of the combustion chamber and controlling such cooling whereby a combustion temperature of not less than 4000 degrees F. is maintained in the engine, allowing the resultant products of combustion to expand and do work as the temperature of the burnt gases drops more than 900 degrees F., discharging the products of combustion, passing the products of combustion into contact with water for the absorption of the nitrogenous compounds from the exhaust gas and then discharging the water for irrigation purposes and discharging the remaining exhaust gas into the atmosphere.

5. The method of fixing and using nitrogenous compounds which consists in burning a mixture of hydrocarbon fuel and air in the proportion of eighteen to nineteen parts of air to one of fuel by volume, using the power thus generated to pump water for irrigation, discharging the spent products of combustion from the internal combustion engine into intimate contact with the water pumped by the engine and maintaining such contact until the nitrogenous compounds in the exhaust gas have been picked up by the water, discharging the water containing such nitrogenous compounds on the land for irrigation and fertilization.

6. The method of producing and recovering nitrogenous compounds from exhaust gas of an internal combustion engine which consists in burning in the engine a mixture in the order of eighteen to nineteen parts of air to one part gaseous fuel, firing the mixture by a multiplicity of simultaneously discharged electric ignition sparks arranged about the combustion area at approximately upper dead center, discharging the exhaust gas, bringing it into intimate contact with a large continuously renewed volume of water and maintaining such contact for a length of time sufficient to cause the water to pick up and carry away the nitrogenous compounds from the exhaust gases.

References Cited in the file of this patent

UNITED STATES PATENTS

| | | |
|---|---|---|
| 961,350 | Hausser | June 14, 1910 |
| 1,000,732 | Hausser | Aug. 15, 1911 |
| 1,121,722 | Fessenden | Dec. 22, 1914 |
| 1,122,923 | Heine | Dec. 29, 1914 |
| 1,272,181 | Andreucci | July 9, 1918 |
| 1,652,781 | Goodwin | Dec. 13, 1927 |
| 2,088,869 | Porter | Aug. 3, 1937 |
| 2,481,890 | Toews | Sept. 13, 1949 |

FOREIGN PATENTS

| | | |
|---|---|---|
| 596,789 | France | Oct. 31, 1925 |
| 596,790 | France | Oct. 31, 1925 |
| 142,953 | Great Britain | May 20, 1920 |

OTHER REFERENCES

Publication: "Internal Combustion Engines" (Lichty), sixth edition, published 1951 by McGraw-Hill (N.Y.), pages 167, 168, 204 through 207, 290, 291 relied on.